US007966317B2

(12) United States Patent
Otake et al.

(10) Patent No.: US 7,966,317 B2
(45) Date of Patent: Jun. 21, 2011

(54) SYSTEM FOR MAKING REPORT WITH AUTHENTICATED IMAGE

(75) Inventors: Hirotaka Otake, Tokyo (JP); Akira Saito, Tokyo (JP); Syuhei Isogaya, Tokyo (JP); Hiromichi Suzuki, Tokyo (JP)

(73) Assignee: JM Corporation, Tokyo (JP)

( * ) Notice: Subject to any disclaimer, the term of this patent is extended or adjusted under 35 U.S.C. 154(b) by 0 days.

(21) Appl. No.: 12/938,886

(22) Filed: Nov. 3, 2010

(65) Prior Publication Data

US 2011/0106571 A1 May 5, 2011

Related U.S. Application Data

(63) Continuation of application No. 11/995,180, filed as application No. PCT/JP2006/313679 on Jul. 10, 2006, now abandoned.

(30) Foreign Application Priority Data

Jul. 11, 2005 (JP) ................................. 2005-201877

(51) Int. Cl.
*G06F 7/00* (2006.01)

(52) U.S. Cl. ........................................................ 707/721

(58) Field of Classification Search .................. 707/720, 707/217

See application file for complete search history.

(56) References Cited

U.S. PATENT DOCUMENTS

| | | | | |
|---|---|---|---|---|
| 7,290,109 | B2 | 10/2007 | Horii et al. | |
| 2002/0099811 | A1 | 7/2002 | Takeda | |
| 2004/0052418 | A1 | 3/2004 | DeLean | |
| 2004/0162872 | A1 | 8/2004 | Friedman et al. | |
| 2005/0015539 | A1 | 1/2005 | Horii et al. | |
| 2006/0270421 | A1* | 11/2006 | Phillips et al. | 455/457 |
| 2007/0198770 | A1 | 8/2007 | Horii et al. | |

FOREIGN PATENT DOCUMENTS

| | | |
|---|---|---|
| JP | 09-305888 | 11/1997 |
| JP | 2001-167133 | 6/2001 |

(Continued)

OTHER PUBLICATIONS

"TDC Software, Field Management Using Camera Cell-phone, automatically adding time and position information", Construction Communication Newspaper, May 28, 2003.

(Continued)

*Primary Examiner* — Pierre M Vital
*Assistant Examiner* — Truong V Vo
(74) *Attorney, Agent, or Firm* — Greenblum & Bernstein, P.L.C.

(57) ABSTRACT

Making a report with an authenticated image includes certifying an imaging time of an image captured by a portable terminal with a camera with an objective time to authenticate image information. A report making program for making a work report is downloaded in the portable terminal by a Web browser from a web server. Report data such as an image and information inputted according to the report making program is sent from the portable terminal to the web server. The web server transfers the report data to a document management program. The document management program automatically sorts the report data according to an information category of the report data and stores the report data. The imaging time of the image information included in the report data or the image information contained in the report made based on the report data is authenticated with a reference time of the web server.

5 Claims, 10 Drawing Sheets

Program store — 100
Synchronize — 200
Report data make — 300
Data send — 400
Data store — 500
Report make — 600

FOREIGN PATENT DOCUMENTS

| | | |
|---|---|---|
| JP | 2002-007657 | 1/2002 |
| JP | 2002-041502 | 2/2002 |
| JP | 2002-073743 | 3/2002 |
| JP | 2002-247223 | 8/2002 |
| JP | 2002-278985 | 9/2002 |
| JP | 3359781 | 10/2002 |
| JP | 2003-078864 | 3/2003 |
| JP | 2003-187015 | 7/2003 |
| JP | 2003-203102 | 7/2003 |
| JP | 2003-242116 | 8/2003 |
| JP | 2003-303266 | 10/2003 |
| JP | 2004-127194 | 4/2004 |
| JP | 2004-133871 | 4/2004 |
| JP | 2004-341955 | 12/2004 |
| JP | 2004-348302 | 12/2004 |
| JP | 2004-357166 | 12/2004 |
| JP | 2005-018388 | 1/2005 |

OTHER PUBLICATIONS

"MAEDA Corporation's Small-lot Repair Services, Improving Efficiency User Camera Cell-phone", Nikkei Business Daily, Jul. 4, 2003.

TDC Software Engineering Homepage, Handy Trust, TDC Software Ingineering, inc, Aug. 10, 2008 (searched May 20, 2008), Internet <http://www.tdc.co.jp/index.html>.

* cited by examiner

| 【work report】 | |
|---|---|
| Document identifier | 123456789 |
| User identifier | ABC123 |
| User name | Taro OO |
| Making time of report | 03/01/20 11:11 |
| Report making place | Shinjuku, Tokyo |
| Document title | Visit to parking area |
| Document message | Layout of parking area A |

【Image report】

| 03/01/20 11:18 | 03/01/20 11:24 | 03/01/20 14:55 |
|---|---|---|
| Before start of work | General view | Details of work |
| | Imaging from south | Enlargement of OO portion |
| Captured image | 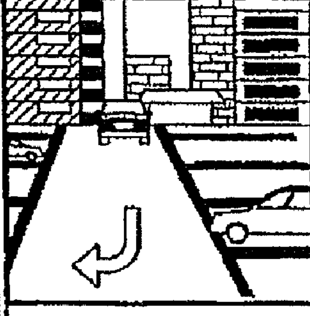 | Captured image |
| Captured image | | |

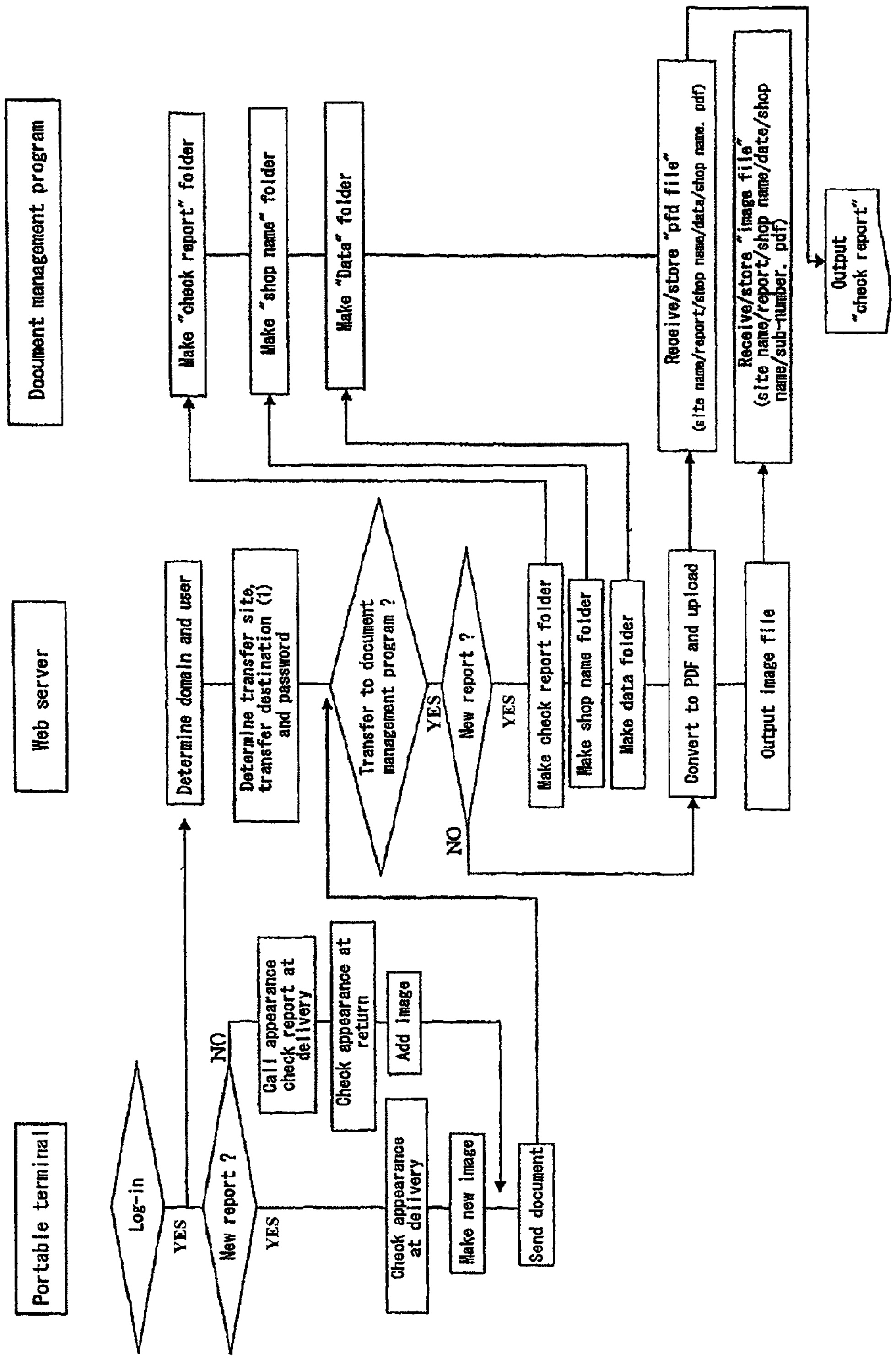
FIG. 9
Portable terminal
Log-in
YES
New report ?
YES
NO
Check appearance at delivery
Make new image
Send document
Call appearance check report at delivery
Check appearance at return
Add image
Web server
Determine domain and user
Determine transfer site, transfer destination (1) and password
Transfer to document management program ?
YES
New report ?
YES
NO
Make check report folder
Make shop name folder
Make data folder
Convert to PDF and upload
Output image file
Document management program
Make "check report" folder
Make "shop name" folder
Make "Data" folder
Receive/store "pfd file" (site name/report/shop name/data/shop name. pdf)
Receive/store "image file" (site name/report/shop name/date/shop name/sub-number. pdf)
Output "check report"

SYSTEM FOR MAKING REPORT WITH AUTHENTICATED IMAGE

CROSS-REFERENCE PARAGRAPH

This is a continuing application of pending U.S. patent application Ser. No. 11/995,180, filed on Jan. 9, 2008, which is a U.S. National Stage of International Application No. PCT/JP2006/313679, filed on Jul. 10, 2006, which claims the benefit of Japanese Application No. 2005-201877, filed Jul. 11, 2005, the contents of which are expressly incorporated by reference herein in their entireties. The International Application was not published under PCT Article 21(2) in English.

TECHNICAL FIELD

The present invention relates to a system for making a report with an authenticated image, in which the pick-up time of an image captured by a terminal such as a portable telephone with a camera (will be referred to as "portable terminal" hereunder) can be used as an authenticating means, to thereby implement various types of certification systems.

BACKGROUND ART

An information gathering support system is disclosed in the Japanese Patent No. 3359781 (will be referred to as "Patent document 1" hereunder). This system is to transfer various kinds of information such as image information to a server. That is, a circumstance where information has been acquired is captured as image information by an electronic camera or digital video camera and transferred by the portable terminal to the server.

A surveillance system and the like using a portable telephone is disclosed in the Japanese Unexamined Patent Publication No. 2002-247223 (will be referred to as "Patent document 2" hereunder). This system is activated in response to an emergency such as invasion into a room under surveillance to capture the invasion for evidence maintenance and early reaction. The surveillance system uses a portable telephone a person owns and carries on, transfers surveillance data including voice to a surveillance center via a public telephone network. Having linkage with the surveillance center, the system keeps the individual person under surveillance for safety.

Further, a surveillance system using a portable telephone is disclosed in the Japanese Unexamined Patent Publication No. 2004-133871 (will be referred to as "Patent document 3" hereunder). This system uses a personal digital assistant provided with a camera and connectable to the Internet and accesses an image data base to and from which image data is sent and received over the Internet. A service provider or user can handle a large volume of image data on the real-time basis by using the personal digital assistant with a camera as an information gathering unit.

DISCLOSURE OF THE INVENTION

In the conventional systems using a captured image as disclosed in the above Patent documents 1 to 3, the image information is handled as important data but it was extremely difficult to use the pick-up time of an image as an evidence and for authentication. The reason why the pick-up time can neither be used as an evidence nor for authentication is that a time indicated along with a captured image is a time peculiar to a clock built in the imaging device body but not any standard time which is based on the time signal. Such a peculiar time is usable as a personal record for the person having captured the image but cannot objectively certify the pick-up time of the image.

The system disclosed in the Patent document 1 is supplied with a circumstance where information has been acquired is captured as image information by an electronic camera or digital video camera. A time peculiar to the electronic camera or digital video camera can be displayed along with an image but there is no authenticity that the displayed pick-up time indicates a standard time. If the peculiar time is different from a due standard time, the image will not be reliable as any news report.

The system which is activated in response to an emergency such as invasion into a room under surveillance or at an emergency during being away from home to capture the invasion or emergency for evidence maintenance, as disclosed in the Patent document 2, is preset to store the date and period of operation of the surveillance camera or the like under control of the surveillance system. It is thus possible to certify the pick-up time of an image captured by an apparatus under control of the surveillance center or the like but no the pick-up time of an image captured by an imaging apparatus not under control of the surveillance center or the like. Thus, in the system disclosed in the Patent document 2, the surveillance center or the like cannot certify the pick-up time of each of images captured by an unspecified number of portable telephones or the like each with a camera.

Further, in the system using a personal digital assistant provided with a camera and connectable to the Internet to access an image data base to and from which image data is sent and received over the Internet on the real-time basis, since the pick-up time of an image captured by a personal digital assistant with a camera is a time peculiar to a clock built in the personal digital assistant, no objective time can be certified with a time indication recorded in the image information.

Allegedly the portable telephones with a camera have been increasingly prevalent to establish an environment for easy utilization of image information provided from the portable telephones The present invention was worked out to overcome the above-mentioned drawbacks of the related art for the sake of such an environment. More particularly, attention was focused on the fact that a system utilizable in various fields can be built through certification, with an objective time, of the pick-up time of an image captured by a portable telephone with a camera. Namely, the present invention preferably provides a system for making a report with an authenticated image with which it is possible to authenticate image information.

According to a first aspect of the present invention, there is provided a system for making a report with an authenticated image comprising:

program storing means 100 for accessing to a Web server 2 by a portable terminal 1 with a camera and Web browser, downloading a report making program from the Web server 2, and storing the report making program to a storage unit in the portable terminal 1;

synchronizing means 200 for sending sync time data from the Web server 2 to the portable terminal 1 when the portable terminal 1 having the report making program stored therein is connected to the Web server 2 to synchronize a time peculiar to the portable terminal 1 with a reference time of the Web server 2;

report data making means 300 for making a report data based on image information captured by the portable terminal 1 and character information on the image which are inputted to the report making program;

data sending means 400 for sending the report data from the portable terminal 1 to the Web server 2;

data storing means 500 for transferring the report data from the data sending means 400 to a document management program 3 in the Web server 2 to automatically sort the report data based on information category thereof; and report making means 600 for controlling the document management program 3 in the Web server 2 from the portable terminal 1 or other Web browser to make a report based on the report data, wherein the synchronizing means 200 is further provided with a function to request the report making program for acquisition of the reference time from the Web server 2, a function to synchronize, when the reference time of the Web server 2 has been acquired before entry of the report data, the time of the report making program with the reference time received from the Web server 2, a function to request the report making program for acquisition of the reference time from the Web server 2, and a function to calculate, when no reference time cannot have been acquired from the Web server 2, a difference between the reference time of the Web server 2 and a time peculiar to the portable terminal 1 and convert a time when the report data has been recorded into the reference time on the base of the time difference, thereby the report data or image information on the report thus made is authenticated with the reference time of the Web server 2.

Also, according to a second aspect of the present invention, there is provided a system for making a report with an authenticated image, wherein the document management program 3 in the data storing means 500 has a Web DAV (Distributed Authoring and Versioning protocol for the WWW) function to permit access from the portable terminal 1 or other Web browser 4.

Also, according to a third aspect of the present invention, there is provided a system for making a report with an authenticated image, wherein the report data making means 300 is set to input an image of the appearance of a rental car going to be rented and information on the image to the report making program as the report data, thereby a report that certifies the car appearance is made.

Also, according to a fourth aspect of the present invention, there is provided a system for making a report with an authenticated image, wherein the report data making means 300 is set to input an image of the appearance of an aircraft and information on the image to the report making program as the report data, and to confirm the report data in the document management program 3 from the Web browser 4 in an aircraft maintenance headquarter, thereby a report that certifies the maintenance status of the aircraft is made.

Also, according to a fifth aspect of the present invention, there is provided a system for making a report with an authenticated image, wherein the report data making means 300 is set to input an image captured of a damaged house going to be assessed by a casualty insurance company and information on the image to the report making program as the report data, and to confirm the report data in the document management program 3 from the Web browser 4 in the insurance company, thereby a report that certifies the damaged status of the house is made.

With the first aspect of the present invention, it becomes possible to provide a system for making a report with an authenticated image which is applicable in many fields by managing the image information from the portable terminal 1 with the camera with an objective time. And also the system can synchronize the pick-up time of an image captured by the potable terminal 1 with the reference time of the Web server 2 by means of synchronizing means 200. As a result, it becomes possible to certify the pick-up time of the image with an objective time like that is the reference time of the Web server 2.

With the second aspect of the present invention, various systems can be configured for making a report with an authenticated image, since the document management program is accessible from the portable terminal 1 or other Web browser 4.

With the third aspect of the present invention, it becomes possible to provide a system for making a report with an authenticated image which is suitably applicable in the field of rent-a-car industry, since the report data making means 300 can make a report that certifies the appearance of a car.

With the fourth aspect of the present invention, it becomes possible to provide a system for making a report with an authenticated image which is suitably applicable in the field of airline industry, since the report data making means 300 can make a report that certifies the status of maintenance of an aircraft.

With the fifth aspect of the present invention, it becomes possible to provide a system for making a report with an authenticated image which is suitably applicable the field of casualty insurance, since the report data making program 300 can make a report that certifies the damaged status of house.

As above, the systems according to the present invention can authenticate the image information captured by a portable telephone with a camera and thus are applicable in various fields of industry.

BEST MODE FOR CARRYING OUT THE INVENTION

The best mode for carrying out the present invention is as follows:

There is provided a program storing means 100 to download a report making program from a Web server 2 to a portable terminal 1 with a camera and Web browser and store the report making program in the portable terminal 1. Also, there is provided a synchronizing means 200 to send sync time data from the Web server 2 to the portable terminal 1 when the portable terminal 1 having the report making program stored therein is connected to the Web server 2 to synchronize a time peculiar to the portable terminal 1 with a reference time of the Web server 2. Also, there is provided a report data making means 300 to make a report data based on image information captured by the portable terminal 1 and character information on the image which are inputted to the report making program. Further, there is provided a data sending means 400 to send the report data from the portable terminal 1 to the Web server 2. Also, there is provided a data storing means 500 to transfer the report data from the data sending means 400 to a document management program 3 having the international standard protocol called "Web DAV (Distributed Authoring and Versioning protocol for the WWW)" in the Web server 2 to automatically sort the report data by report data on the basis of the document management program 3. Further, there is provided a report making means 600 to control the document management program 3 in the Web server 2 from the portable terminal 1 or other Web browser to make a report based on the report data. The report data or image information on the report thus made are authenticated with the pick-up time of the image information.

Embodiments

In the system according to an embodiment of the present invention, a report making program for making a work report is downloaded from the Web server 2 to a user's portable terminal 1 with a camera and Web browser. The report data such as image, information, etc. inputted based on the report making program are sent from the portable terminal 1 to the Web server 2. In the Web server 2, the report data are transferred to a document management program which will automatically sort and store the report data based on information category of the report data. Then, image information in the report data and pick-up time of an image attached to a report made from the report data are authenticated with the reference time of the Web server 2.

The basic configuration of the system includes six basic elements including a program storing means 100, synchronizing means 200, report data making means 300, data sending means 400, data storing means 500 and a report making means 600 as shown in FIG. 1. Each of these elements will be explained below.

The program storing means 100 downloads the report making program to the portable terminal 1, and stores it in a storage unit of the portable terminal 1.

To download the report making program, the portable terminal 1 is used to access the Web server 2 for supply of the report making program as shown in FIG. 2. The user starts the browser of the portable terminal 1 and inputs URL for access to the Web server 2. Then, the user sends a download request from the portable terminal 1 to the Web server 2 via the Internet I. The download request includes a user identifier and data on a password.

As shown in FIG. 2, the portable terminal 1 includes dial buttons 104, display 101, select button 102 and mode change button 103. This portable terminal 1 has an ordinary telephone mode, mail mode for sending and receiving an electronic mail, browser mode for displaying a Web page and a program run mode for execution of various programs. A mode change button 103 is provided on the portable terminal 1 to change one of such modes (telephone mode, for example) to another (program run mode, for example).

The display 101 shows a variety of display screens of the portable terminal 1. Also, it shows an input screen for execution of each program and an image captured by a built-in imaging mechanism which will be described later.

The select button 102 on the portable terminal 1 has a pointer moving function and clicking function. By designating a direction with the select button 102, the pointer can be moved in that direction. By pressing the select button 102, an item pointed by the pointer can be selected. Then, using the dial buttons 104, characters etc. can be inputted to the field of the selected item. The portable terminal 1 has a sound input/output unit 105 including a microphone, speaker, etc. used in the telephone mode.

The document management program 3 in the Web server 2 having received the download request from the portable terminal 1 checks a user identifier and password included in the download request with each other.

When authentication by the user is complete, the Web serer 2 sends a report making program to the portable terminal 1 via the Internet I. In this case, the data in the program thus sent includes a variety of screen data such as log-in screen data and a password for log-in at start of the program. It should be noted that the password is a user password associated with a portable terminal identifier of portable terminal 1 having downloaded the program.

The portable terminal 1 having received the report making program stores the received program therein. Thus, the user can use the report making program at the portable terminal 1.

The synchronizing means 200 sends sync time data from the Web server 2 to the portable terminal 1 when the latter having stored the report making program in the program storing means 100 is connected to the Web serer 2 to synchronize a time peculiar to the portable terminal 1 with the reference time of the Web server 2.

The time peculiar to the portable terminal 1 is synchronized with the reference time of the Web server 2 in steps as shown in FIG. 3. First in step S1-1, the report making program stored in the portable terminal 1 is put into run. More specifically, the select button 102 is used to select the report making program from among application programs displayed on the display 101 of the portable terminal 1. Thus, the portable terminal 1 starts the selected report making program.

In step S1-2, the portable terminal 1 having started the report making program displays a log-in screen 50 shown in FIG. 6 on the display 101. The log-in screen 50 has a password input field 501 and OK button 502. The user inputs his or her password to the password input field 501 and presses the OK button 502.

Then in step S1-3, a controller 11 provided in the portable terminal 1 tries to authenticate the user. More particularly, the portable terminal 1 checks the password entered by the user and a password stored in the program storage unit 14 with each other. At this time, if the password entered by the user is found not coincident with that stored in the program storage unit 14, the starting operation is ended.

On the other hand, when the password entered by the user is found coincident with that stored in the program storage unit 14 and the user authentication is complete, the portable terminal 1 tries connection to the Web server 2 in step S1-4. At this time, the portable terminal 1 will send its serial number and password to the Web server 2.

In case the portable terminal 1 has successfully connected to the Web server 2 (YES in step S1-5), the Web server 2 sends sync time data to the portable terminal 1 in step S1-6. More specifically, the clock time of the Web server 2 is taken as a reference time and sent as a sync time to the portable terminal 1. The sync time data is a time managed by the document management program 3 in the Web server 2. It should be noted that when the Web server 2 sends the sync time, it is disconnected from the portable terminal 1.

The portable terminal 1 having acquired a sync time sets the sync time in step S1-7. More specifically, first a clock time used in the report making program stored in the portable terminal 1 is adjusted for coincidence with the received sync time. Also, the time peculiar to the portable terminal 1 may be directly synchronized with the sync time data.

On the other hand, in case the portable terminal 1 has failed in connection with the Web server 2 (NO in step S1-5), the timer is reset in step S1-8. More specifically, the clock time used in the report making program is reset. The timer is a local time managing means for relatively managing a time before synchronized with a time managed by the Web server 2. In the subsequent operations, the Web server 2 is accessed, and when the peculiar time of the portable terminal 1 is found synchronous with the time managed by the Web server 2, the elapsed time measured by the time is used to calculate back each time.

When a sync time has thus set in step S1-7 or timer has been reset in step S1-8, the controller 11 in the portable terminal 1 will display a menu screen 60 shown in FIG. 6 on the display 101 in FIG. 2 in step S1-9.

On the hand, the portable terminal 1 records a pick-up time as will be explained below with reference to FIG. 4. In case the sync time acquired from the Web server 2 is set as the clock time used in the report making program (YES in step S3-1), the sync time is recorded as the pick-up time of a recorded image in step S3-2. That is, in case connection to the Web server 2 is successfully made at start of the program (YES in step S1-5), the reference time used in the report making program is recorded.

In case no sync time has yet been set (NO in step S3-1), the controller 11 of the portable terminal 1 records the timer time in step S3-3. Namely, in case the connection to the Web server 2 is not successful at start of the program (NO in step S1-5), the controller 11 will record an elapsed time after the timer is reset (in step S1-8). Thereafter, when report data is transferred to the document management program 3, the pick-up time is adjusted to the reference time on the basis of the elapsed time and a present reference time.

Thus, the time peculiar to the portable terminal 1 or display time of the report making program and the like are synchronized with the reference time of the Web server 2.

Inputting various kinds of information to the report making program, the report data making means 300 makes report data. It is supplied with captured image information and pick-up time as well as with character information on the image on the basis of the report making program.

To supply various kinds of information to the report making program, a report making screen 70 (as shown in FIG. 6) displayed on the portable terminal 1 is used. The report making screen 70 has a title field 701, message field 702, new image button 703 and a pictures list 704. A document title of a report is written to the title field 701. A message to be attached to the report is written to the message field 702. The new image button 703 is to attach a new picture along with the pick-up time of the picture. The pictures list 704 is a field where a picture title attached to a report is indicated along with the pick-up time of the picture. The report making screen 70 has an end button 705 to end the report making operation, and a send button 706 to send a made report.

On the other hand, when the new image button 703 is pressed on the menu screen 60, a new report making screen 70 is displayed in the display 101 of the portable terminal 1. In this case, the title field 701, message field 702 and pictures list 703 are blank. Using the select button 102 and dial buttons 104, the user sets necessary characters in these fields. Thus, new report document data 120 is made and recorded in the report document data storage unit 12.

The report data thus entered is sent by the data sending means 400 from the portable terminal 1 to the Web server 2. The report is sent to the Web server 2 as will be explained below with reference to FIG. 5.

After inputting information such as captured image etc. to the report data, the user displays the report making screen 70 shown in FIG. 6 on the display 101 shown in FIG. 2. Here, the user presses the send button 706 on the report making screen 70. In case the connection to the Web server 2 is not successful at this time (NO in step S4-1), the portable terminal 1 will exit the operation with display of a message "sending impossible" on the display 101 (in step S4-2). See FIG. 5.

In case the portable terminal 1 has succeeded in connection to the Web server 2 (YES in step S4-1), it will send, to the Web server 2, report data including a report document, report image, pick-up time, present time (sending time) and data on the portable terminal 1 in step S4-3.

The data storing means 500 transfers the report data thus sent to the document management program 3 in the Web server 2 and records the received report data by information category of the report data in step S4-4.

More specifically, the document management program 3 will record data such as document identifier, document title and message in the received report document data to document data 231 in the work report data storage unit as shown in FIG. 7. Also, the document management program 3 record data such as image title, image message and pick-up time of received report image data 130 in the received work report data storage unit to image data 232 in the work report data storage unit. Thus, the document management program 3 in the Web server 2 sequentially records the report data sent from the portable terminal 1.

When the document management program has the international standard protocol called "Web DAV (Distributed Authoring and Versioning protocol for the WWW)", it will freely be accessed from the portable terminal 1 or other Web browse 4. "Autodesk Buzzsaw (registered trademark) by the Autodisk, USA, is a typical example suitable for use as a document management program. With this document management program, it is possible to upload information in the report data of course in a text form and even in PDF, JPG or the like form. Also, it is possible to automatically sort the report data by folder or file. Therefore, this document management program is suitable for use to handle data with image.

The report making means 600 controls the document management program 3 in the Web server 2 from the portable terminal 1 or other Web browser 4 to make a report based on the report data. Since the pick-up time synchronous with the reference time of the Web server 2 is displayed in the image data in the report data and image information in the report, it will be possible to authenticate these image information with the reference time.

To output the report, access is made from the portable terminal 1 or Web browser of other computer terminal 30 as shown in FIG. 2. At this time, the computer terminal 30 sends, to the Web server 2, data on the user identifier and password entered by the user. The Web server 2 confirms the authority of outputting the report on the basis of the received data. In case the authority of outputting is successfully confirmed, a list of report data that can be outputted under the authority of outputting is displayed on the computer terminal 30. More specifically, the document management program 3 acquires, from the work report data storage unit, the document title of work report data 230 (shown in FIG. 7) that can be outputted, and sends it to the computer terminal 30.

Here the user selects a specific report content from the list of report data displayed at the computer terminal 30. Thus, the computer terminal 30 will display a report screen 90 shown in FIG. 8.

The report screen 90 shows work report data 230 shown in FIG. 7 and each image data 232 associated with the document data 230. In the illustrated example, a work report is displayed (see FIG. 8). The work report shows the document identifier of the document data 231, user identifier, user name, report making time, report making place, document title and document message. Further, the report screen 90 shows each image, sync imaging time of each image, document title and document message as the image data 232. Thus, the report screen 90 can be used to make a work report.

The present invention is basically constructed as having been described above. According to the present invention, systems for various fields can be built as will be explained below. For example, FIG. 10 shows a system for making a report that certifies the appearance of a car going to be rent. In this system, the report data making means 300 inputs a captured image of the car going to be rent and information on the image as the report data to the report making program to make a report that certifies the appearance of the car.

Generally in the rent-a-car business, the client is given an explanation of the external status (appearance) of a car going to be rent, such as any scratch, paint injury, etc. at the time of delivery and it is checked at the time of returning whether there is any change in the car appearance. Currently, the car appearance is checked based on the appearance check report. However, the content of this checking is not definite and the content of authentication to be done in the presence of the client is unclear. Also, in the rent-a-car business, a length of time from deliver to return is stated in the rent-a-car contract. Therefore, a time when the appearance check is made at the time of delivery and a time when the appearance is made at the time of return are specified.

When a report that certifies the appearance of a car is made according to the present invention, the car appearance can be checked while the check report can visually be confirmed. This contributes to the work management for the employee of the rent-a-car shop, maintenance and management of the cars to rent and appropriate certification for the client.

FIG. 9 shows a flow of operations made in an application of the present invention to the rent-a-car business. The basic operations will not be described here because they are the same as those in the aforementioned basic system. This application system is characterized in that a report data carrying an image of an injured coated surface, captured by the portable terminal 1, is registered in the document management program 3 and displayed on a personal computer display or printed out as a check report for confirmation by the client.

At the time of returning the car having been rented, the car body is checked for any new injury in the presence of the client with reference to the check report as printout of the report data in the document management program 3.

If no new injury is detected, the car body is wholly imaged by the portable terminal 1 and the car body image is registered in the document management program 3. If a new injury is detected, however, the injured portion is imaged and registered in the document management program 3 and consultation is made with the client for application of insurance set forth in the contract.

At this time, the check result that is a print-out of the report data will also lead to smooth application of insurance because the imaging time is authenticated with the reference time of the Web server 2.

Also, the present invention can be applied to a system for making a report that certifies the maintenance status of an aircraft (not shown). In this case, the report data making means 300 is set to input a captured image of the maintenance status of an aircraft and information on the image as report data to the report making program. Also, the system is adapted to confirm the report data in the document management program 3 from the Web browser 4 of the aircraft maintenance headquarter and make a report that certifies the maintenance status of the aircraft.

In these years, many aircraft accidents have occurred. Useless to say, inspection and maintenance of the aircraft are extremely important. The system for making a report that certifies the maintenance status of an aircraft should be able to authenticate the time and results of inspection and maintenance made before departure and permit to make instant check of the inspection and maintenance statuses as if the personnel of the airline company, responsible for the inspection and maintenance, were at the site of checking.

The operations made in this system areas follows. The inspection and maintenance made at the place of departure are imaged by the portable terminal 1 and registered as report data in the document management program 3. The report data can instantly be checked on a computer at a remote aircraft maintenance headquarter via the Web server 2 and document management program 3 in order to approve the departure of an aircraft.

Also at the rime of arrival, the inspection and maintenance statuses of the aircraft are imaged by the portable terminal 1 and checked on a computer at the remote aircraft maintenance headquarter to approve the departure of the aircraft. With such operations repeated, inspection record with a specified date is registered in the document management program 3. Thus, it is possible to manage the record of aircraft inspection and record of repair and part replacement, for always assuring safe operation of aircraft.

The present invention is also applicable to a system for making a report that certifies the damaged status of house. In this system, the report data making means 300 is set to input a captured image of a damaged house going to be assessed by a casualty insurance company and information on the image as the report data to the report making program. Also, this system is so designed that report data in the document management program can be checked from the Web browser at the insurance company and a report is made which certifies the damaged status of the house.

The casualty insurance company dealing with the casualty insurance should assess whether damage to a house covered by the casualty insurance at occurrence of a typhoon or earthquake is owe to the natural calamity or negligence. The assessment takes much time, labor and cost. Start time and end time of the natural calamity attacked can be determined based on information available from the Meteorological Office or various information from other sources. The authentication of the damaged status has been a large burden to the insurance company.

According to the present invention, the authentication can be simplified. More specifically, in case the client image of the casualty insurance company has his house damaged by a natural disaster, he or she images the damaged status by the portable terminal 1 on the day and sends the image to URL of the insurance component he made a contract with. The insurance company can confirm the applicability of insurance on he basis of the image registered in the document management program 3. The present invention permits to specify the date of casualty attacking. Those concerned (investigator or investigation agency) can access the registered information over the Web, and the report that certifies the damaged status can be printed out. Thus, the present invention can simplify the authentication and it contributes more to reduced costs than the conventional systems.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners for application to very many fields of industry such as a direct-from-the-farm business in which an image showing a harvesting date is attached to a product to certify that the product has been delivered directly from the farm, a rescue system in which an image of visible injury status of a casualty.

BRIEF DESCRIPTION OF THE DRAWINGS

FIG. 8 explains a screen appearing when an image is captured.

FIG. 9 shows a flow of operations made in another embodiment of the present invention.

EXPLANATION OF REFERENCE NUMERALS

Figure 1:
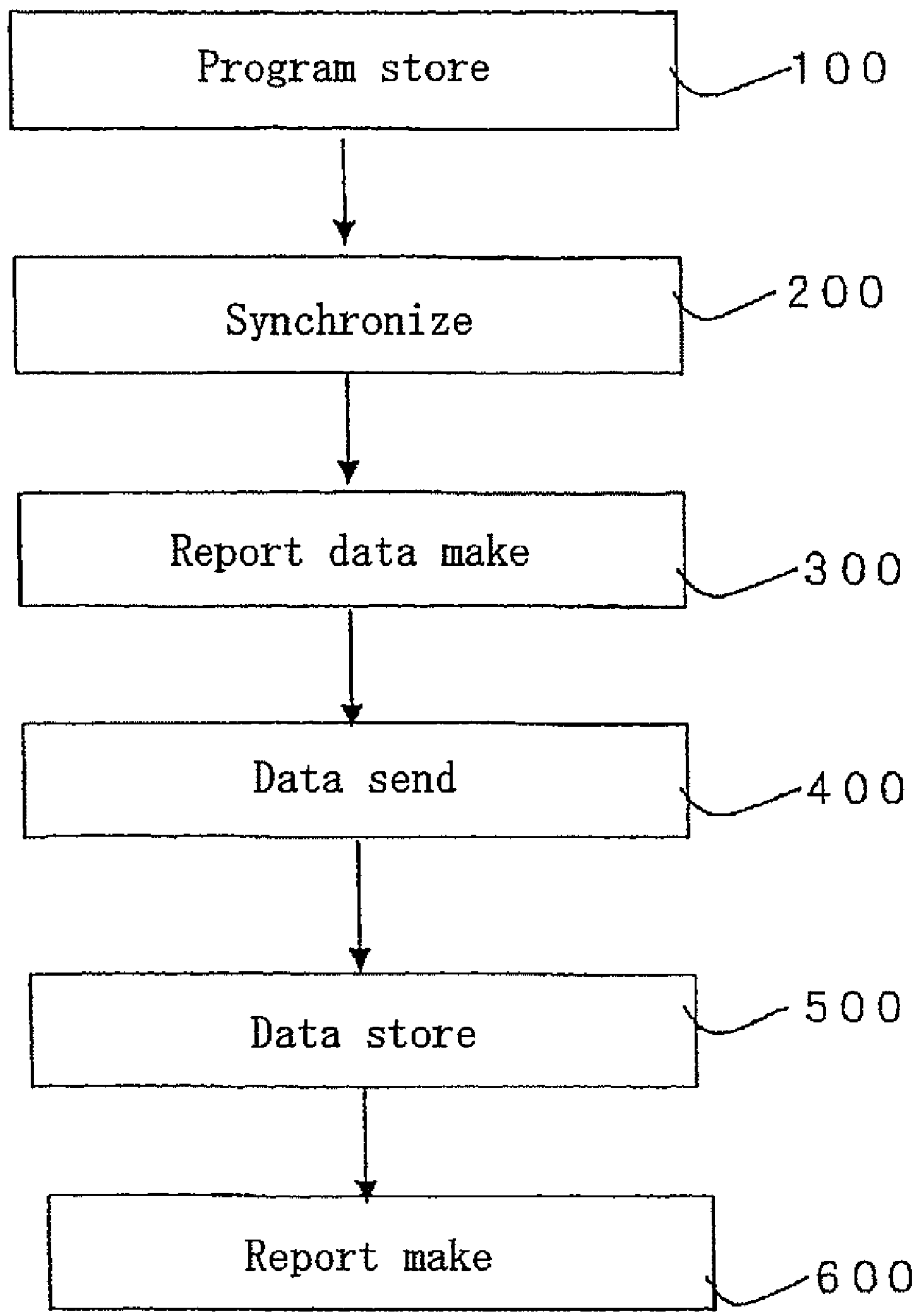
FIG. 1 shows a flow of operations made in the system for making a report with an authenticated image according to an embodiment of the present invention.
Figure 2:
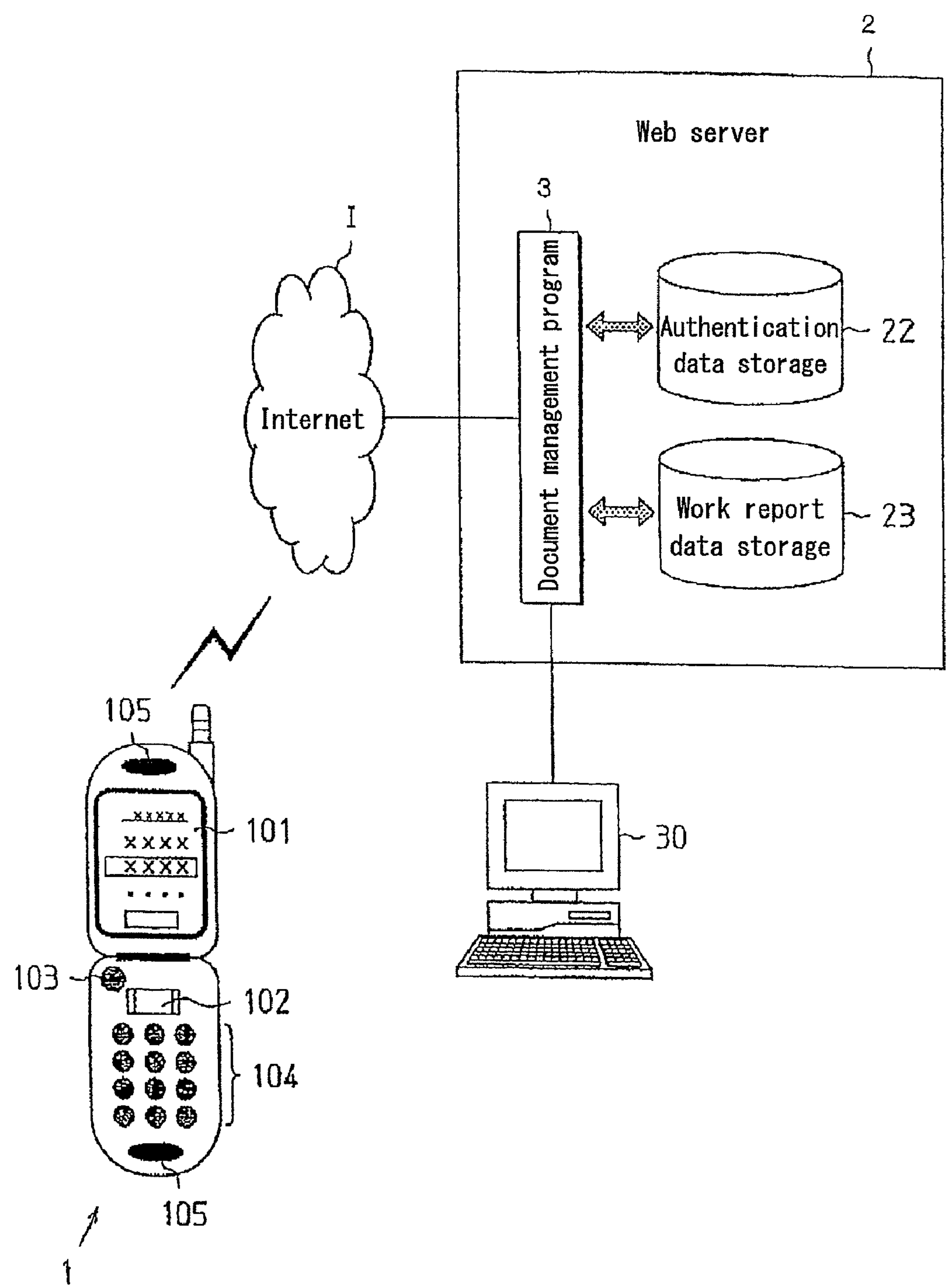
FIG. 2 is a schematic block diagram of the system according to the embodiment shown in FIG. 1.
Figure 3:
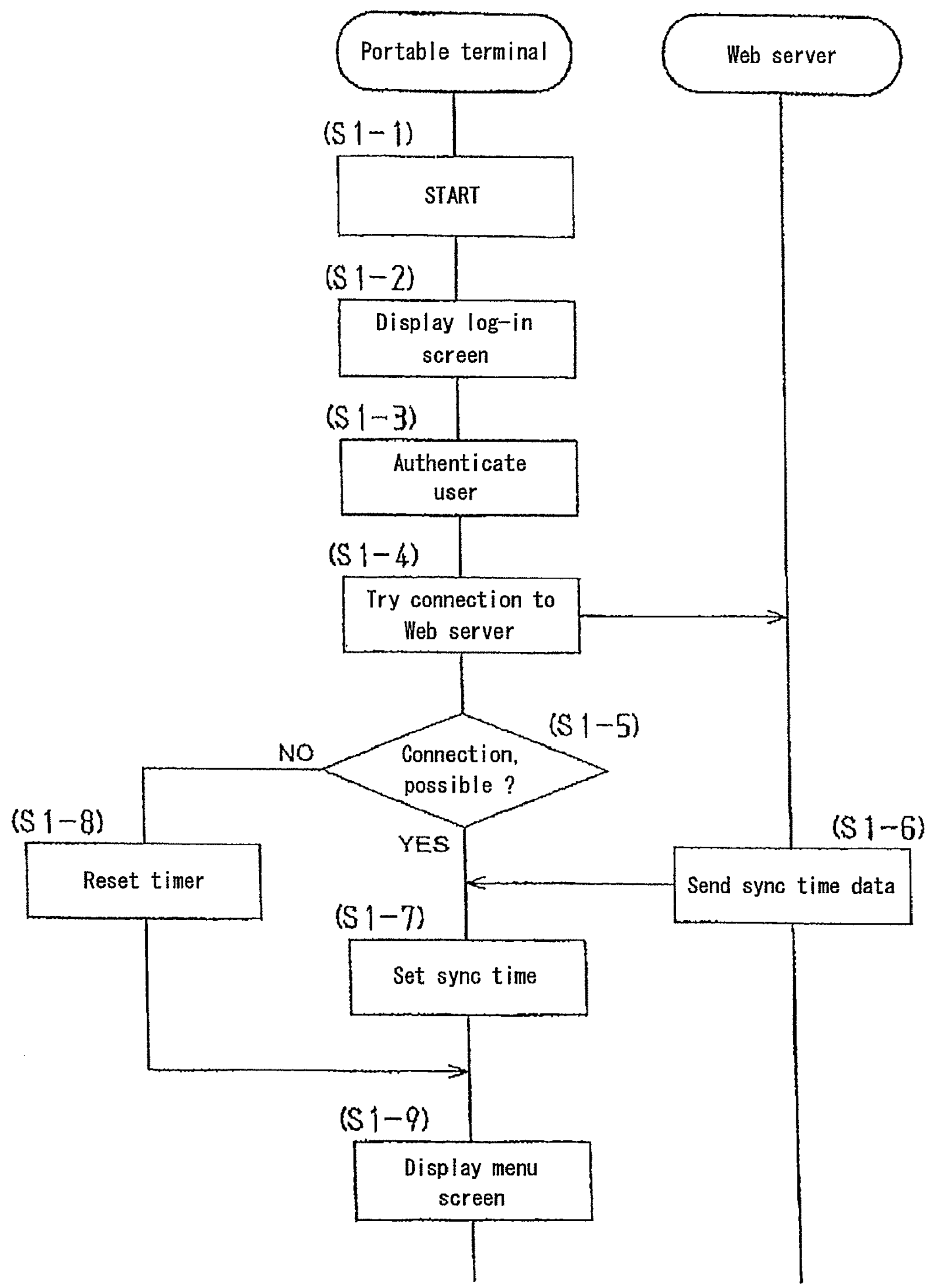
FIG. 3 shows a flow of operations made at start of the system.
Figure 4:
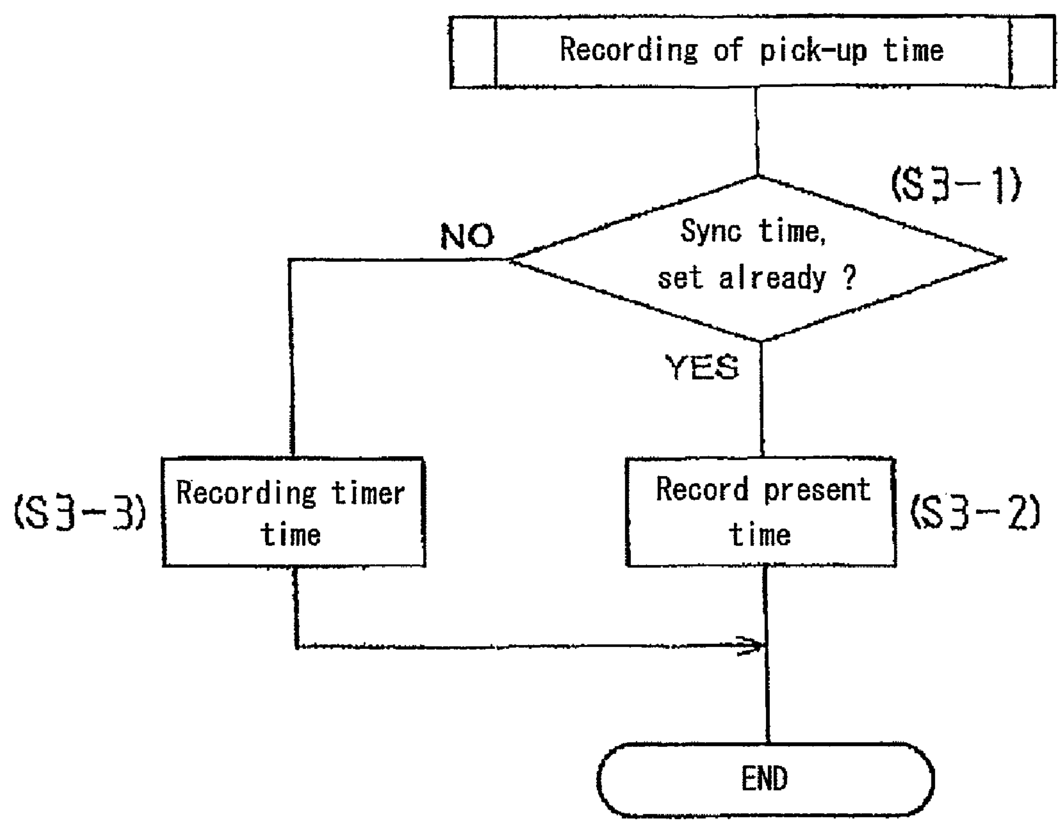
FIG. 4 shows a flow of operations made in recording a pick-up time.
Figure 5:
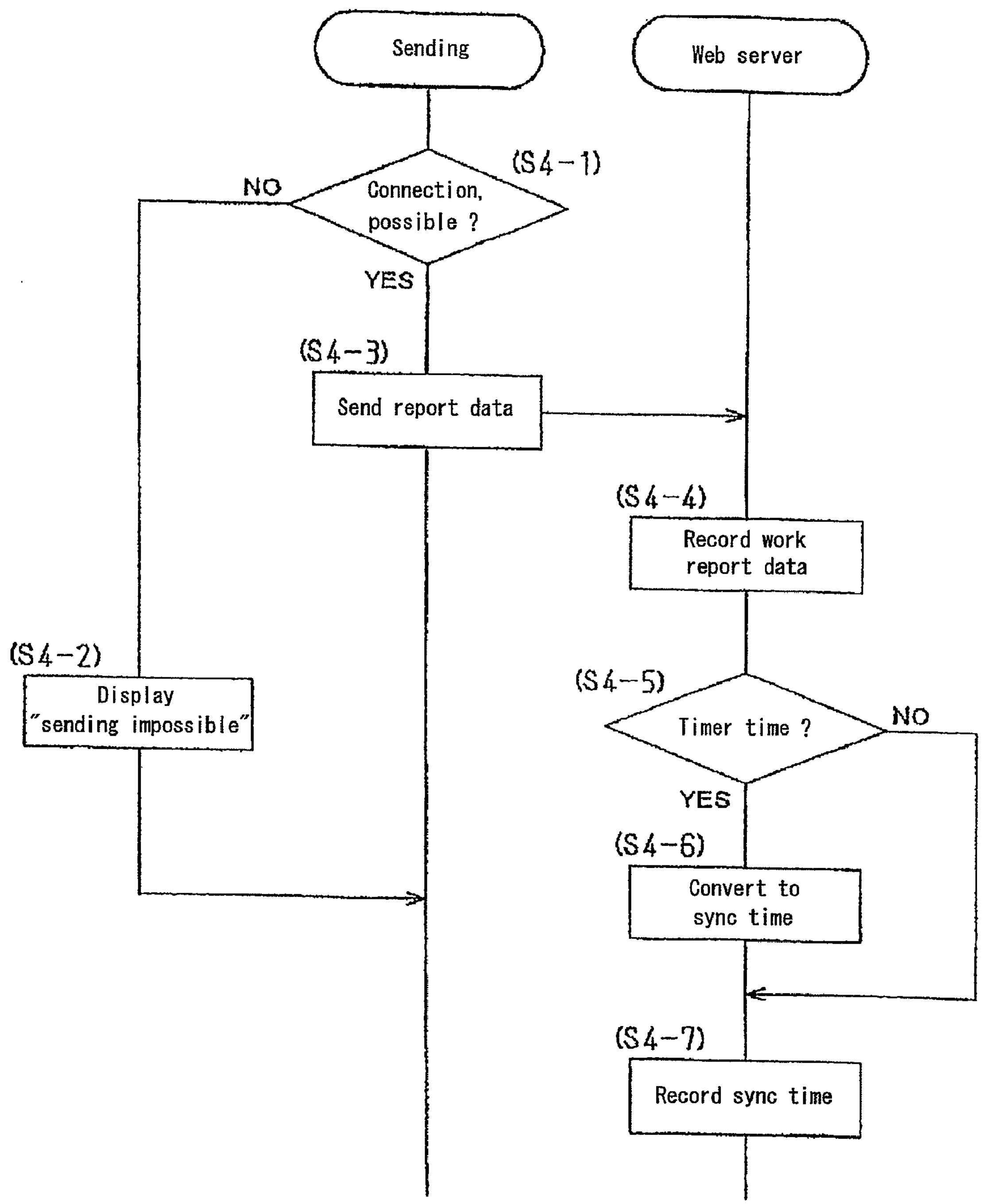
FIG. 5 shows a flow of operations made in sending report data.
Figure 6:
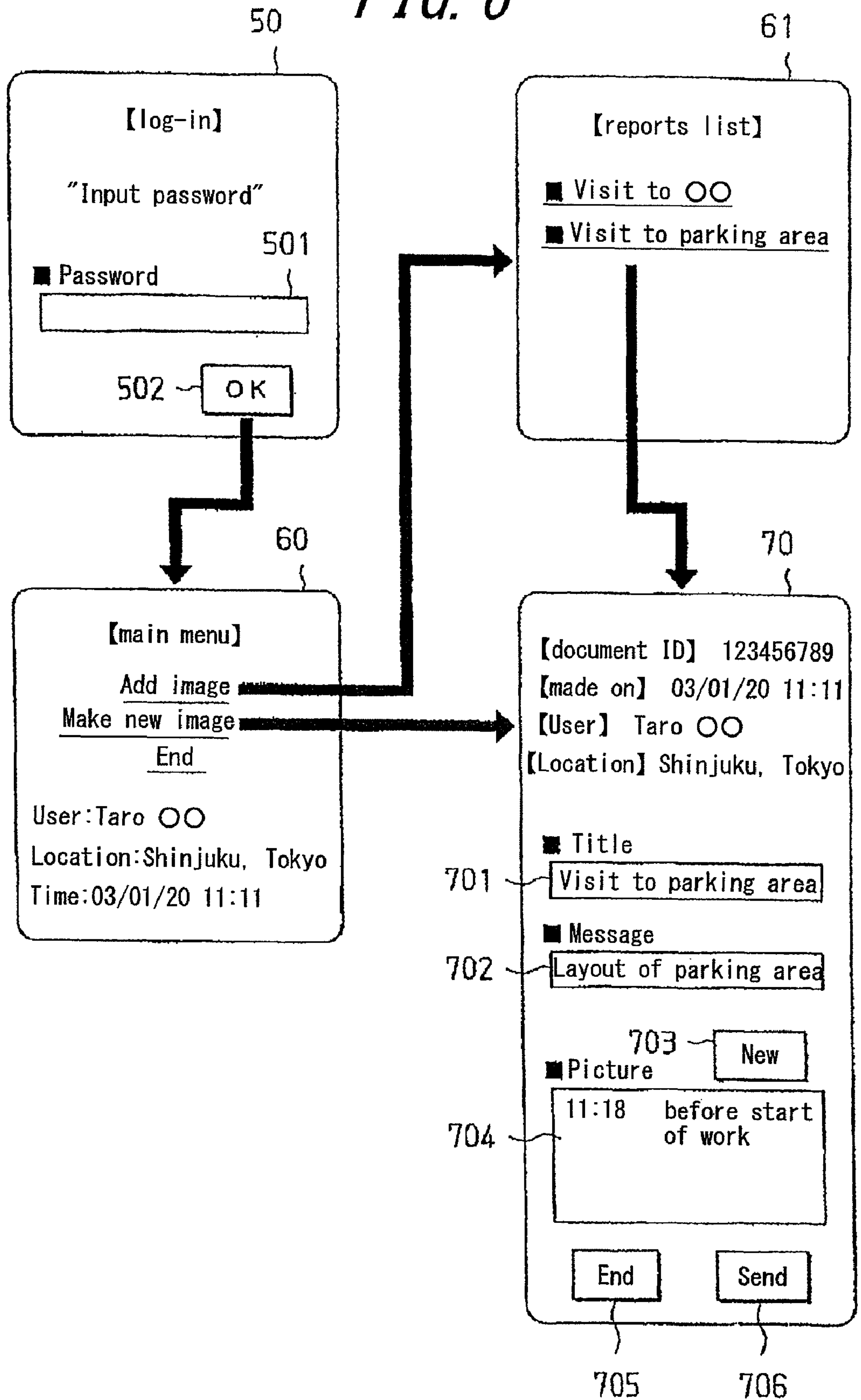
FIG. 6 explains a menu screen, report making screen, etc.
Figure 7:
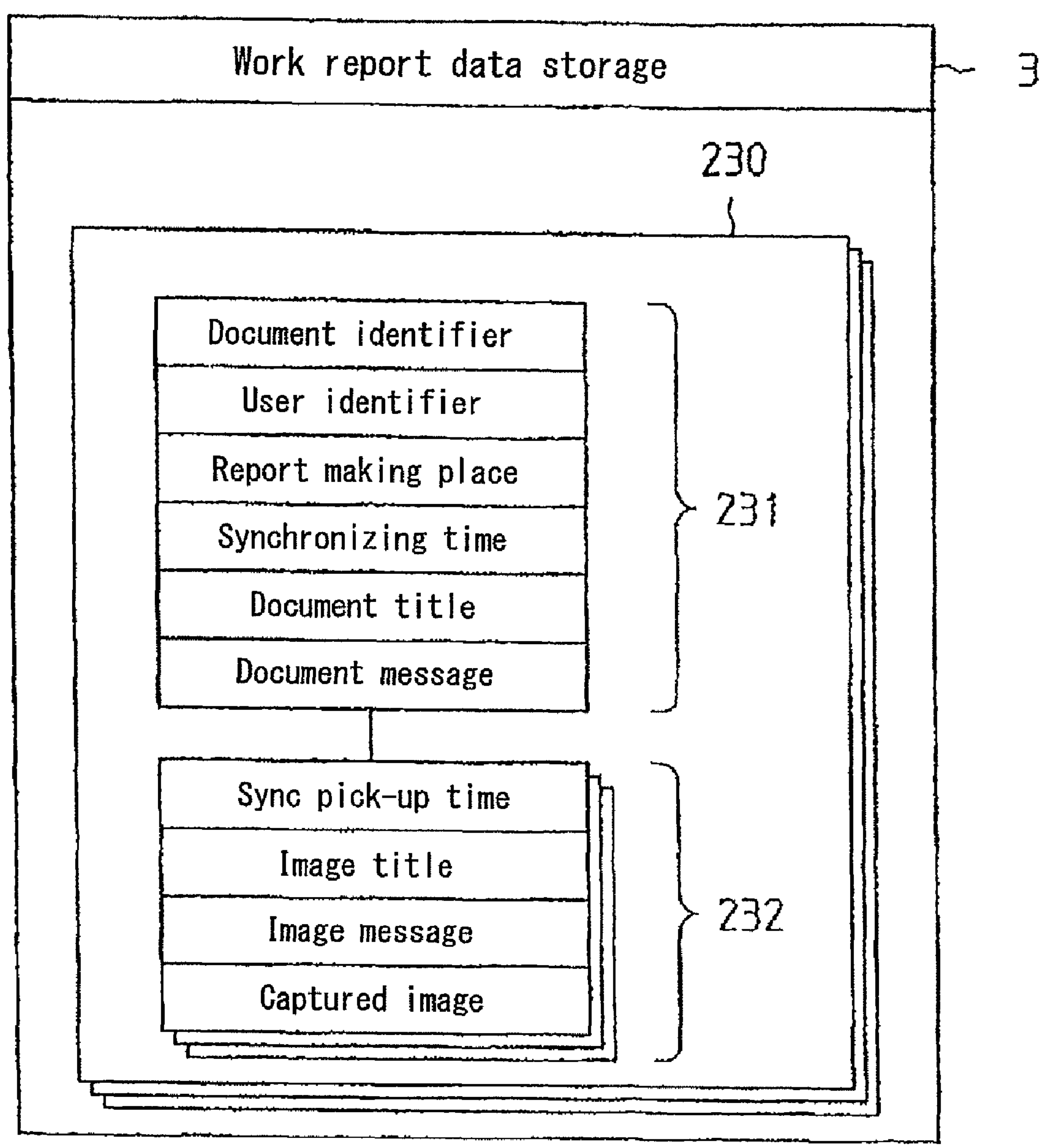
FIG. 7 shows data stored in a work report data storage unit.
Figure 10:
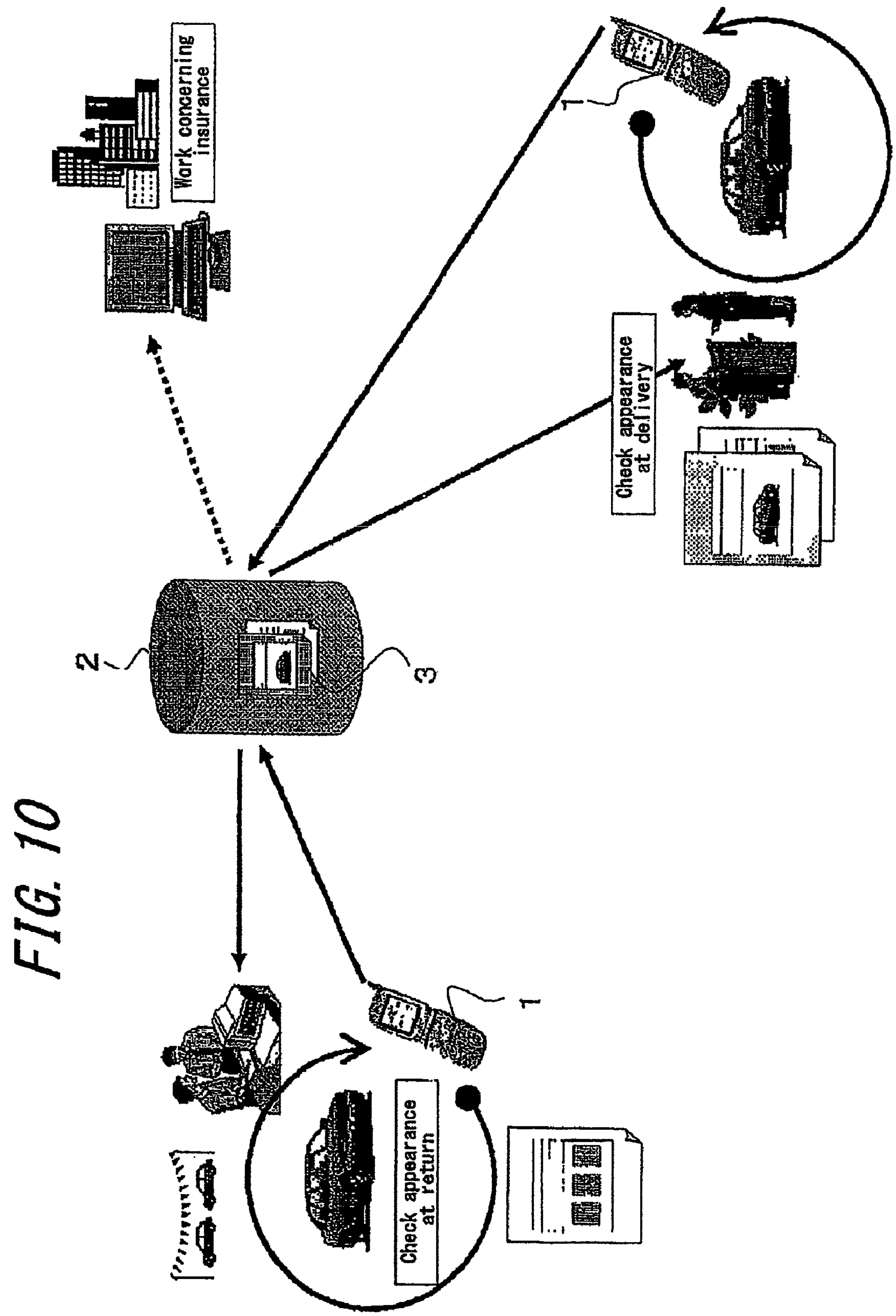
FIG. 10 shows the concept of the another embodiment.

1 Internet
2 Web server
3 Document management program
100 Program storing means
200 Synchronizing means
300 Report data making means
400 Data sending means
500 Data storing means
600 Report making means

What is claimed is:

1. A system for making a report with an authenticated image, comprising:

a program storage that accesses a Web server, by a portable terminal with a camera and a Web browser, to download a report making program from the Web server to the portable terminal, and that stores the report making program in the portable terminal;

a synchronizer that sends sync time data from the Web server to the portable terminal, when the portable terminal with the report making program is connected to the Web server, to synchronize a time specific to the portable terminal with a reference time of the Web server;

a report data maker that inputs image information captured by the portable terminal and character information on the image to the report making program to make report data;

a data sender that sends the report data from the portable terminal to the Web server;

a data storage that transfers the report data from the data sender to a document management program in the Web server to automatically sort the report data by the document management program based on an information category of the report data; and a report maker that controls the document management program in the Web server from the portable terminal or another Web browser to make a report based on the report data, wherein the synchronizer has a converting function by which a clock time of the Web server is used as the reference time and the sync time data is sent from the Web server to the portable terminal when the portable terminal having the report making program is connected to the Web server, when the sync time data acquired from the Web server is set as a clock time used in the report making program of the portable terminal, the reference time used in the report making program is recorded as a pick-up time of an image picked-up by the portable terminal, and when the sync time data is not set in the portable terminal due to a failure of the portable terminal in connection with the Web server when the report making program of the portable terminal is running, a timer is reset by the portable terminal and an elapsed time after the timer is reset is recorded, and the pick-up time of the image is adjusted to the reference time based on the elapsed time and a present reference time, and wherein the data storage has a Web Distributed Authoring and Versioning (DAV) function to permit access from either the portable terminal or the another Web browser.

2. The system according to claim 1, wherein the image is an image of a rental car to be rented and information on the image is inputted as the report data to the report making program to make a report that certifies an appearance of the rental car.

3. The system according to claim 1, wherein the report data maker is set to input the image, the image being an image of an aircraft and information on the image as the report data to the report making program, to confirm the report data in the document management program from the Web browser at an aircraft maintenance headquarters, and to make a report that certifies a maintenance status of the aircraft.

4. The system according to claim 1, wherein the report data maker is set to input the image, the image being an image captured of a damaged house to be assessed by a casualty insurance company and information on the image as the report data to the report making program, to confirm the report data in the document management program from the Web browser at the insurance company, and to make a report that certifies a damaged status of the damaged house.

5. The system according to claim 2, wherein the report data maker is set to input the image, the image being an image of an aircraft and information on the image as the report data to the report making program, to confirm the report data in the document management program from the Web browser at an aircraft maintenance headquarters, and to make a report that certifies a maintenance status of the aircraft.

* * * * *